No. 890,473. PATENTED JUNE 9, 1908.
E. J. VRAALSTAD.
VEHICLE STEERING DEVICE.
APPLICATION FILED APR. 19, 1907.
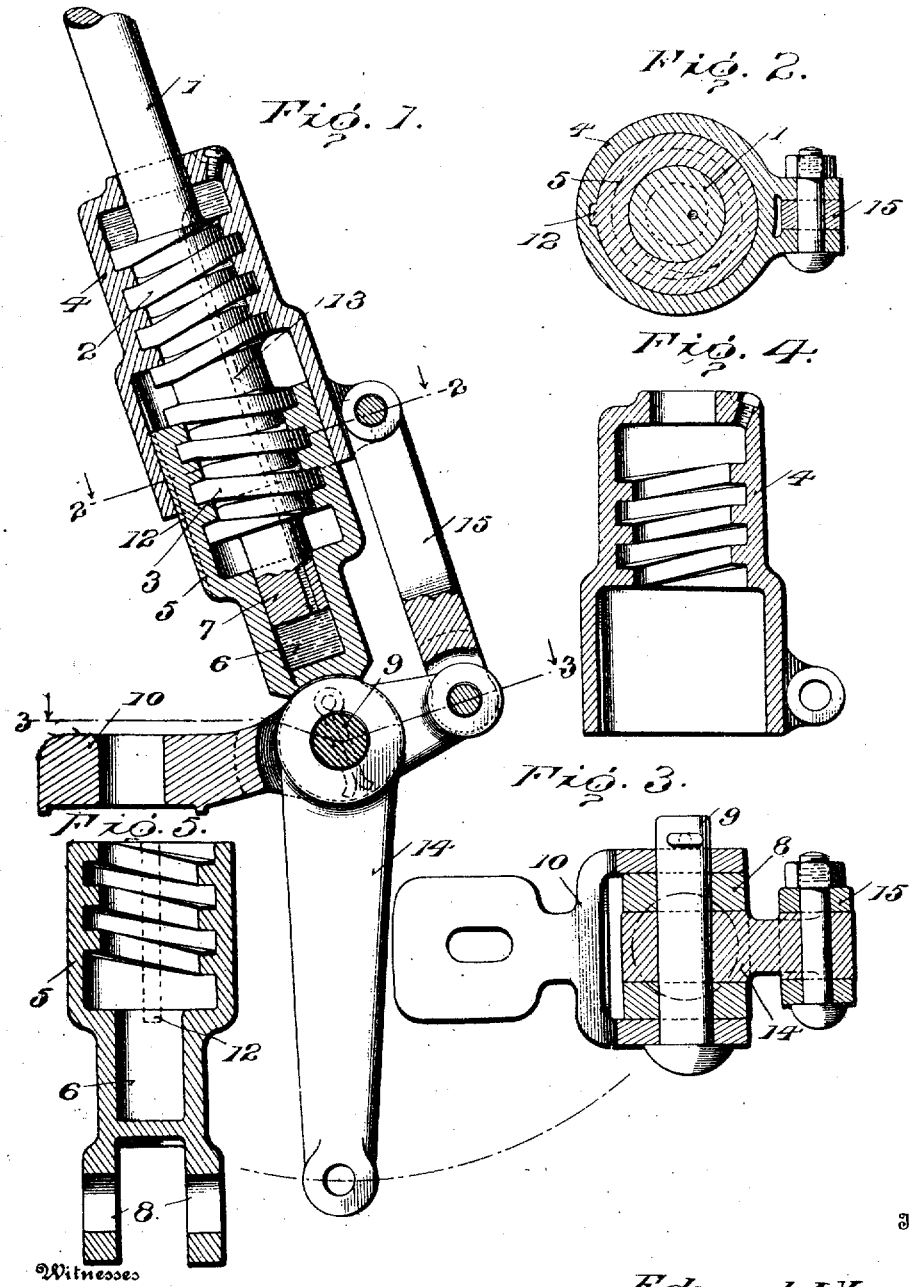
Inventor
Edward J. Vraalstad

UNITED STATES PATENT OFFICE.

EDWARD J. VRAALSTAD, OF BUFFALO, NEW YORK.

VEHICLE STEERING DEVICE.

No. 890,473.　　　Specification of Letters Patent.　　　Patented June 9, 1908.

Application filed April 19, 1907. Serial No. 369,081.

*To all whom it may concern:*

Be it known that I, EDWARD J. VRAALSTAD, of Buffalo, in the county of Erie and State of New York, have invented certain new and useful Improvements in Vehicle Steering Devices; and I do hereby declare the following to be a full, clear, and exact description of the invention, such as will enable others skilled in the art to which it appertains to make and use the same.

The primary object of this invention is to provide a motor vehicle steering device which will be compact, dust-proof, and self-oiling.

The invention will be hereinafter fully set forth and particularly pointed out in the claims.

In the accompanying drawings, Figure 1 is a vertical longitudinal sectional view. Figs. 2 and 3 are cross sectional views on lines 2—2, and 3—3, respectively, Fig. 1. Figs. 4 and 5 are exterior views of the two coöperating members.

The present improvements embody, in a modified form, the characteristics of the steering device embraced by my application for Letters Patent filed May 29, 1906, Serial Number 319,367, in that the steering rod 1 is equipped with right- and left- hand screw threads 2 and 3 whereon work corresponding nuts 4 and 5. In the present instance each of the nuts is in the form of an interiorly-threaded member or chamber, both being open at their opposite ends and closed at their outer ends. The lower nut is telescoped by and serves as a guide for the upper nut, and is formed with a central bore 6 to accommodate an extension 7 of the steering rod, such extension projecting beyond thread 3 and fitting snug within said bore. This nut at its lower end has spaced apart ears 8 which are pivotally secured by a bolt 9 to a forked bracket 10 secured to the vehicle frame (not shown). The diameter of the lower portion of nut 4 is greater than that of nut 5, which latter it telescopes, and is formed with a longitudinal recess to take in a spline 12 of the lower nut. One or more bores 13 may extend longitudinally through the threaded portion of the steering rod so as to establish communication between the upper and lower ends of the two chambered nuts. Oil supplied to the top of the upper nut will find its way through opening 13 into the bottom of the lower nut. When the steering rod is turned, to draw the nuts closer together, the lower nut will act as a pump-barrel, the steering rod serving as a plunger or piston to force the oil through opening 13 to the top of the upper nut. In this way the parts will be self-lubricated, and by reason of the tight fit between the telescoping portions of the chambered nuts the working parts will be kept free from dust.

I have shown the swinging member 14 as pivotally mounted on bolt 9, and its upper free end as connected by a link 15 to an ear of the lower portion of nut 4. It will be understood, as pointed out in my before noted application for patent, that the swinging member is suitably connected to one of the steering wheels of the vehicle.

I have herein designated the two coöperating parts 4 and 5 as nuts, although neither possesses the characteristic appearance of an ordinary nut. Each is in the form of an interiorly threaded chamber, but my invention is not restricted in that respect. The advantages sought may be obtained by any means which embodies two coöperative members, the relative positions of which may be changed by the turning of the steering rod, and which members aside from effecting the actuation of the lever or swinging member connected to one of the steering wheels, serve to protect the working parts from dust, and at the same time constitute an oil reservoir.

I claim as my invention:

1. In a steering-gear for vehicles, the combination with a steering rod, and a duplex male screw-thread thereon, of two interiorly-threaded nuts, one for each thread, one nut being telescoped by an extension of the other nut, and a swinging member actuated by said nuts.

2. In a steering-gear for vehicles, the combination with a steering rod, and a duplex screw-thread thereon, of two nuts, one for each thread, a fixed support for one nut, the other nut telescoping the latter, and a swinging member actuated by said nuts.

3. In a steering-gear for vehicles, the combination with a steering rod, and a duplex screw-thread controlled thereby, of two nuts, one for each thread, one nut being telescoped by the other, means for guiding the telescoping sections, a swinging member pivotaly secured to one of said nuts, and a link pivotally secured to said swinging member and to the other of said nuts.

4. In a steering-gear for vehicles, the combination with a steering rod, and a duplex screw-thread thereon, of two interiorly-threaded chambered members forming nuts, one of said members telescoping the other, and both having oil-containing chambers at their outer ends, and an oil passage through which oil may be forced from one chamber to the other by the action of said steering rod.

5. In a steering gear for vehicles, the combination with a steering rod, and a duplex screw-thread thereon, of two interiorly threaded chambered members forming nuts, one of said members telescoping the other, and both having oil-containing chambers at their outer ends, said steering rod having an opening extending therethrough forming an oil-passage between said chambers.

6. In a steering-gear for vehicles, the combination with a steering rod having a duplex screw-thread thereon and an end extension, of upper and lower, interiorly threaded, chambered members engaging said thread, one member telescoping the other, a fixed support for the lower member which latter is formed with a bore to accommodate said end extension, an oil passage being formed between said bore and the top of the upper nut, a swinging member mounted on said support, and a link connecting said swinging member to said upper member.

In testimony whereof, I have signed this specification in the presence of two subscribing witnesses.

EDWARD J. VRAALSTAD.

Witnesses:
J. NOTA McGILL,
FRANCIS S. MAGUIRE.